United States Patent [19]

Pickel

[11] 4,313,527

[45] Feb. 2, 1982

[54] BRAKE SHOE SECURING ARRANGEMENT

[75] Inventor: Hajo Pickel, Kelkheim, Fed. Rep. of Germany

[73] Assignee: ITT Industries, Inc., New York, N.Y.

[21] Appl. No.: 142,528

[22] Filed: Apr. 21, 1980

Related U.S. Application Data

[63] Continuation of Ser. No. 3,177, Jan. 15, 1979, abandoned.

[30] Foreign Application Priority Data

Feb. 3, 1978 [DE] Fed. Rep. of Germany ....... 2804619

[51] Int. Cl.³ ............................................. F16D 65/04
[52] U.S. Cl. ................................. 188/73.32; 188/73.1; 411/529
[58] Field of Search .................... 188/73.6, 73.3, 72.4, 188/73.5, 73.1, 71.1, 250 B, 250 G, 234; 85/36

[56] References Cited

U.S. PATENT DOCUMENTS

| | | | |
|---|---|---|---|
| 3,198,294 | 8/1965 | Stacy | 85/36 X |
| 3,387,687 | 6/1968 | Eggstein et al. | 188/73.3 X |
| 3,625,314 | 12/1971 | Rinker | 188/73.5 X |
| 3,933,227 | 1/1976 | de Gennes | 188/73.3 X |
| 3,941,216 | 3/1976 | Burgdorf | 188/73.6 X |
| 4,004,658 | 1/1977 | Margetts et al. | 188/73.5 |

FOREIGN PATENT DOCUMENTS

| | | | |
|---|---|---|---|
| 592909 | 10/1947 | United Kingdom | 85/36 |
| 1379099 | 1/1975 | United Kingdom | 188/73.1 |

*Primary Examiner*—George E. A. Halvosa
*Attorney, Agent, or Firm*—John T. O'Halloran; Alfred C. Hill

[57] ABSTRACT

An arrangement is disclosed to secure a brake shoe in a caliper of a disc brake. This arrangement includes a lug of low minimum height formed in the center of the rear surface of the pad carrier plate in one single operation together with the manufacture of the pad carrier plate and a rectangular spring plate having a slot in the center thereof parallel to its long dimension to engage the lug in a locking manner with the opposite ends of the long dimension of the spring plate engaging a bearing surface in a central opening of the caliper in which the brake shoe is positioned.

7 Claims, 3 Drawing Figures

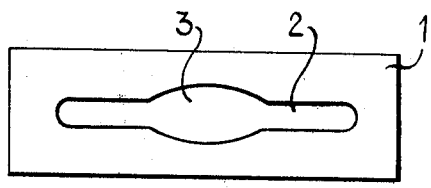
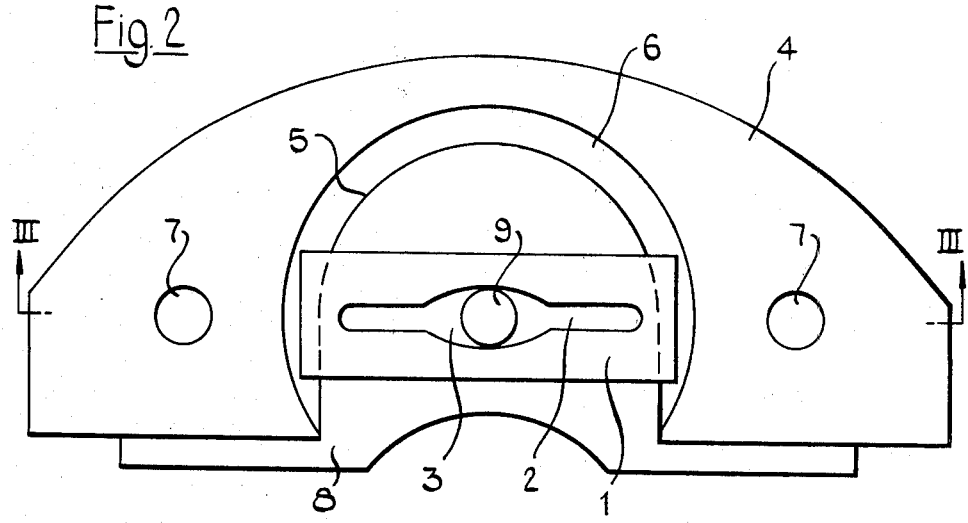
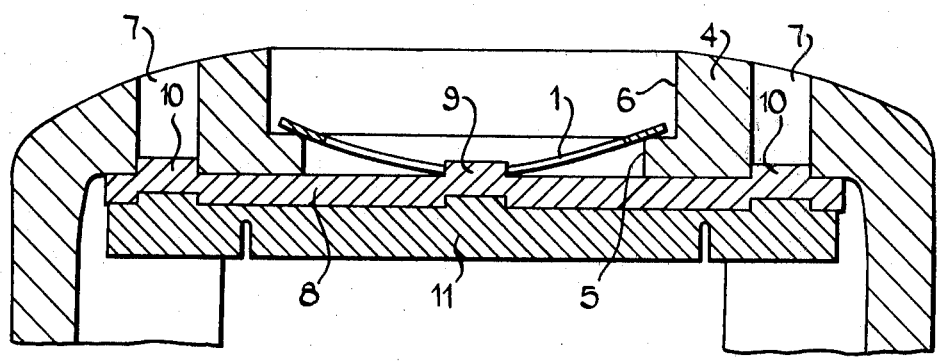

BRAKE SHOE SECURING ARRANGEMENT

CROSS REFERENCE TO RELATED APPLICATIONS

This is a continuation of application Ser. No. 003,177, filed Jan. 15, 1979, now abandoned.

BACKGROUND OF THE INVENTION

This invention relates to disc brakes and more particularly to a spring for securing brake shoes in a caliper of a disc brake.

From Austrian Pat. No. AT-PS 260,039 a floating-caliper disc brake is known wherein the pad carrier plate of the brake shoe rigidly secured to the brake caliper includes a pin which is arranged on the rear side of the pad carrier plate and extends through a bore in the head of the brake caliper. Fitted to the free end of the pin is a locking ring referred to as a bolt lock, the outer edge of which bears upon a bearing surface within the brake caliper.

Another embodiment of such securing arrangements is described in German Printed Specification No. DE-OS No. 2,313,692. In this specification, the pin secured to the pad carrier plate has a circumferential groove for locking engagement with a bayonet-type opening provided on a retaining spring.

The known arrangements enable the pad carrier plate to be secured to the brake caliper resiliently. However, all versions necessitate a pin to the free end of which a retaining spring or a locking plate is fitted, the pin being of such length as to make it impossible for the pad carrier plate and the pin to be manufactured in one single operation. It is, therefore, necessary to manufacture the pins in a separate operation and mount them on the pad carrier plate. Considering the quantities in which such components are usually manufactured, the expenditure of material and time is substantial. The manufacture of pad carrier plates with projections within the range of up to about 3 mm (millimeters) for example, is possible, as practice shows with respect to the projections for the required support. These small projections are not, however, sufficient for fastening using the known means.

SUMMARY OF THE INVENTION

It is, therefore, an object of the present invention to provide a spring for securing brake shoes to a brake caliper permitting the locking engagement with lugs of a low minimum height, provides a high clamping force and, in addition, can be manufactured at low cost.

A feature of the present invention is the provision of an arrangement to secure a brake shoe in a caliper of a disc brake comprising: a locking means formed in the center of one surface of a pad carrier plate of the brake shoe, the one surface of the pad carrier plate being parallel to the other surface of the pad carrier plate upon which a pad of the brake shoe is secured, the one surface of the pad carrier plate being disposed in a central opening of the caliper, the central opening having a bearing surface adjacent the one surface of the pad carrier plate; and a rectangular spring plate having a slot disposed in the center thereof parallel to its long dimension to engage the locking means in a locking manner and opposite ends of the long dimension engaging the bearing surface.

The advantages of the spring of the present invention are that:

(a) it obviates the need to produce pins and mount them on the pad carrier plate; instead, a lug is produced by pressing on the rear side of the pad carrier plate during the latter's production process;
(b) the clamping force of the spring is high; and
(c) the mounting of the spring is very simple because the front and rear sides are identical.

In a preferred embodiment of the spring of the present invention, arcuate recesses are provided approximately in the middle of the spring's longitudinal slot, these recesses being preferably less arcuate than the locking means. As a result, the spring, when mounted, is automatically in its middle position and held there invariably. This is an advantage because the ends of the spring cannot slip off the bearing surface of the brake caliper even though the distance between the spring ends becomes smaller as a result of the deflection of the spring. In specific applications it may be useful to warp or bend the edges of the spring. This is a preferred arrangement if there is the risk of the spring turning on the bearing surface. The warped edges of the relatively hard spring steel will be pressed into the bearing surface of the softer brake caliper, thus precluding any position change of the spring. For the purpose of achieving a high resilience and a safe clamping effect, it is an advantage that the spring, when mounted, is bent in its longitudinal direction towards the pad carrier plate.

BRIEF DESCRIPTION OF THE DRAWING

Above-mentioned and other features and objects of this invention will become more apparent by reference to the following description taken in conjunction with the accompanying drawing, in which:

FIG. 1 illustrates a spring in accordance with the principles of the present invention;

FIG. 2 is a side elevation of a brake caliper with the brake pad secured thereto by the spring of FIG. 1; and FIG. 3 is a section along the line III—III of FIG. 2.

DESCRIPTION OF THE PREFERRED EMBODIMENT

FIG. 1 shows a spring 1 made of spring steel and having a slot 2 extending in the longitudinal direction of spring 1 over nearly its whole length. Slot 2 is arranged symmetrically in relation to the longitudinal and transverse axis of spring 1 and has in its middle part arcuate recesses 3 on both sides, the largest width of which lies approximately on the transverse axis of spring 1.

FIG. 2 shows a brake caliper 4 having an opening 5 with a circular countersink 6. A bore 7 is provided on either side of opening 5. Inserted into brake caliper 4 is a brake shoe whose pad carrier plate 8 is provided with a centrally disposed lug 9 coaxial with the longitudinal central axis of countersink 6. Spring 1 is mounted on lug 9 such that spring 1 clamps lug 9 in the middle part of slot 2 with its arcuate recesses 3 and the ends of spring 1 bear upon the bearing surface formed by countersink 6. Lug 9 is of small height, 1 mm, for example is sufficient.

FIG. 3 shows a section along the line III—III of FIG. 2. Brake caliper 4 has an opening 5 with a countersink 6 and two bores 7. On its rear side, pad carrier plate 8 is provided with lug 9 referred to previously and with two further lugs 10, the latter being conformed to the diameter of, and distance between bores 7. A brake pad 11 is fitted to the front side of pad carrier plate 8. Spring 1 is inserted in such a manner that lug 9 is clamped in the middle of spring 1 and its ends bear upon the bearing surface provided by countersink 6.

To assemble the above-described unit, the brake shoe including brake pad 11 and pad carrier plate 8 is inserted into brake caliper 4 such that lugs 10 of pad carrier plate 8 engages into bores 7. Spring 1 of FIG. 1 is placed in the countersink 6 and moved in the middle onto pad carrier plate 8 until lug 9 which is exposed in opening 5 locks into spring 1. The ends of spring 1 continue bearing on the bearing surface in countersink 6 which results in a deflection of spring 1 in its longitudinal direction, there being thereby achieved not only a high resilience of spring 1 but also a safe clamping effect at lug 9. A widening of slot 2 and consequent disengagement of spring 1 need not be feared because the deflection of spring 1 in the longitudinal direction precludes its deflection in the transverse direction.

While I have described above the principles of my invention in connection with specific apparatus it is to be clearly understood that this description is made only by way of example and not as a limitation to the scope of my invention as set forth in the objects thereof and in the accompanying claims.

I claim:
1. An arrangement to secure a brake shoe in a caliper of a disc brake comprising:
a cylindrical lug formed in the center of, extending outwardly from and perpendicular to one surface of a pad carrier plate of said brake shoe during the manufacture of said pad carrier plate, said one surface of said pad carrier plate being parallel to the other surface of said pad carrier plate upon which a pad of said brake shoe is secured, said one surface of said pad carrier plate being disposed adjacent an open end of a central circular opening of said caliper coaxial of a central longitudinal axis of said central opening, said lug being coaxial with said axis and extending into said central opening, said central opening having a bearing surface spaced inwardly from said open end within said central opening coaxial of said axis and a given distance from and parallel to said one surface of said pad carrier plate; and a rectangular spring plate having an elongated slot disposed in the center thereof parallel to and substantially coextensive with its long dimension, said slot having an arcuate recess in each edge of said slot in the middle thereof to engage the outer surface of said lug in a locking manner adjacent said one surface, and opposite ends of said long dimension of said spring plate engage said bearing surface, said lug having a height less than said given distance and said spring plate is bent in a concave manner looking out of said central opening toward said lug in said long dimension from said bearing surface toward said one surface of said pad carrier plate when said spring plate is locked on said outer surface of said lug to ensure a safe locking of said spring plate on said lug in both the long and short dimension of said spring plate.

2. An arrangement according to claim 1, wherein said lug has a minimum height.

3. An arrangement according to claim 2 wherein said recesses are less arcuate than said outer surface of said lug.

4. An arrangement according to claim 3, wherein the edge of each of said opposite ends are pressed into said bearing surface.

5. An arrangement according to claim 1, wherein said recesses have dimensions less than the dimensions of said outer surface of said lug.

6. An arrangement according to claim 5, wherein the edge of each of said opposite ends are pressed into said bearing surface.

7. An arrangement according to claim 1, wherein the edge of each of said opposite ends are pressed into said bearing surface.

* * * * *